United States Patent
Kester

(10) Patent No.: US 9,850,980 B2
(45) Date of Patent: Dec. 26, 2017

(54) CABLE PULLER FOR PORTABLE MAST

(71) Applicant: Jeffery Kester, Marshall, TX (US)

(72) Inventor: Jeffery Kester, Marshall, TX (US)

( * ) Notice: Subject to any disclaimer, the term of this patent is extended or adjusted under 35 U.S.C. 154(b) by 0 days.

(21) Appl. No.: 14/717,500

(22) Filed: May 20, 2015

(65) Prior Publication Data

US 2016/0341278 A1    Nov. 24, 2016

(51) Int. Cl.
  *F16G 11/12*    (2006.01)
  *F16G 11/02*    (2006.01)
  *E04H 12/20*    (2006.01)

(52) U.S. Cl.
  CPC ............ *F16G 11/12* (2013.01); *F16G 11/025* (2013.01); *E04H 12/20* (2013.01)

(58) Field of Classification Search
  CPC ........ F16G 11/12; F16G 11/025; F16G 11/02; E04H 12/20
  See application file for complete search history.

(56) References Cited

U.S. PATENT DOCUMENTS

| | | | | | |
|---|---|---|---|---|---|
| 2,905,491 | A | * | 9/1959 | Olson | F16G 11/12 403/299 |
| 2,962,129 | A | * | 11/1960 | Walton | F16G 11/06 403/286 |
| 3,081,116 | A | * | 3/1963 | Weiner | F16G 11/02 403/44 |
| 3,152,668 | A | * | 10/1964 | Smith | E04H 12/20 403/230 |
| 4,594,018 | A | * | 6/1986 | Larsson | F16G 11/12 403/43 |
| 4,962,620 | A | * | 10/1990 | Mastalski | E04H 12/20 52/147 |
| 7,469,617 | B2 | * | 12/2008 | Basile | F16C 1/22 74/501.5 R |
| 8,051,615 | B2 | * | 11/2011 | Mathews | F16G 11/00 403/78 |

* cited by examiner

*Primary Examiner* — Adriana Figueroa
*Assistant Examiner* — Jessie T Fonseca
(74) *Attorney, Agent, or Firm* — Braxton, Hilton & Perrone PLLC

(57) ABSTRACT

A system and method for pulling a cable. The system includes a cable which has at least one button located along its length. A cable puller is coupled to the cable and has at least one slot for receiving the cable. The cable puller also has a plate for engaging the button. The cable puller has a sleeve with an upstream end and a downstream end, and the plate is located on the upstream end. The plate prevents movement of the button upstream of the plate.

12 Claims, 3 Drawing Sheets

CABLE PULLER FOR PORTABLE MAST

BACKGROUND OF THE INVENTION

Technical Field

The present invention relates to a system and method for pulling a cable.

Description of Related Art

Typically, only the ends of a cable is used to secure a cable. However, it would be desirable to grab and secure a cable or rope along its length as opposed to the end without causing damage to the cable.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
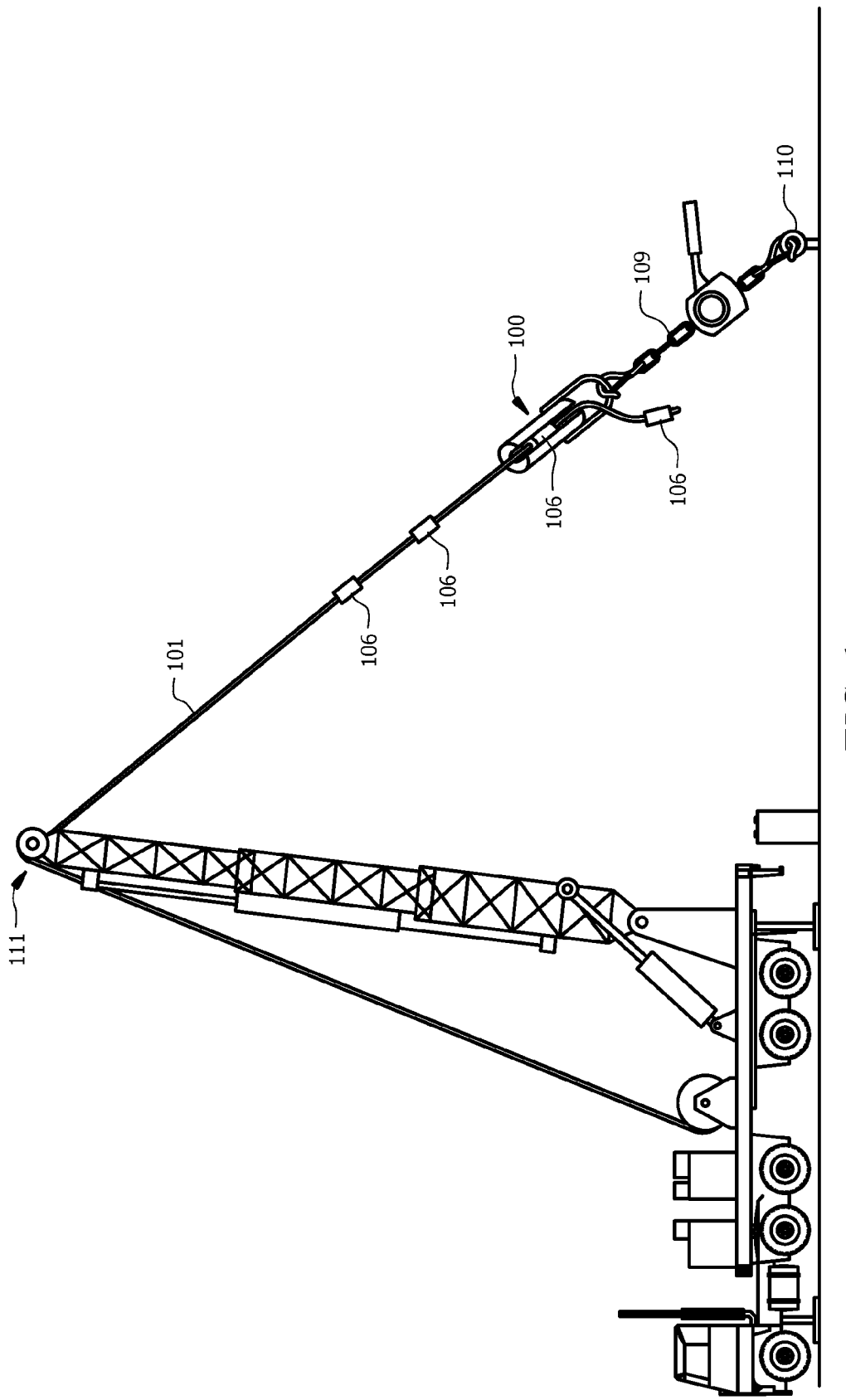
FIG. 1 is a side view of a pulling system in one embodiment.

FIG. 1 is a side view of a pulling system in one embodiment. As depicted, the cable puller 100 is coupled to a cable 101. As used herein, the term cable shall refer to any rope, cable, wire, string, etc. which has a length and is used to couple to items. In one embodiment, the cable 101 comprise a "guy wire." A guy wire is a tensioned cable designed to add stability to a free-standing structure such as ship masts, radio masts, wind turbines, utility poles, tents, ladders, drilling masts, well service rig mast, portable masts, portable derricks etc. As depicted the cable 101 couples the mast 111 to an anchor 110. While a drilling mast 111 is depicted, this is for illustrative purposes only and should not be deemed limiting. Virtually any structure can be utilized in the system disclosed herein.

The anchor 110 is illustrated as being anchored in the ground. The anchor can comprise stakes, as well as permanent or temporary structures, which couple and secure the cable 101 to the ground. In other embodiments the guy wire is anchored to a portable rig base beam or matting board.

As can be seen, the cable 101 has at least one button 106. In one embodiment the button 106 is positioned at the end of the cable 101, but in one embodiment the cable 101 comprises at least one button 106 positioned along its length. Put differently, in one embodiment the cable 101 comprises a button 106 which is not located at its ends. The button 106 can comprise any item which is crimped or otherwise secured and coupled to the cable 101. In one embodiment the button 106 comprises a National Swage Button manufactured by the Crosby Group. In one embodiment the buttons are swaged or crimped onto the wire permanently.

The buttons 106, when positioned along the length of the cable 101 as opposed to the ends, provides a gripping surface along the length of the cable 101 which was previously unavailable. This allows tension to be applied along the length of the cable 101 as opposed to only at the end of the cable. Consider a one hundred foot length of cable 101 used to secure a ten-foot tall mast. If only the ends of the cable 101 could be used to apply tension, then the end of the hundred foot length of cable 101 would need to be pulled to exert tension. However, by having buttons 106 placed along the length of the cable 101, tension can be applied at virtually any desired location along the length of the cable 101. This advantage allows cables 101 of various lengths to be utilized without having to destroy, cut, bend, or otherwise damage the cable 101. This leads to increased life of the cable 101, decreasing waste and decreasing capital cost. Previously, a knot or bend would have to be created in the cable to create a loop which could be grabbed. A knot, bend, or kink in the cable leads to destruction of the cable. As such, the cable must be replaced frequently.

Figure 2:
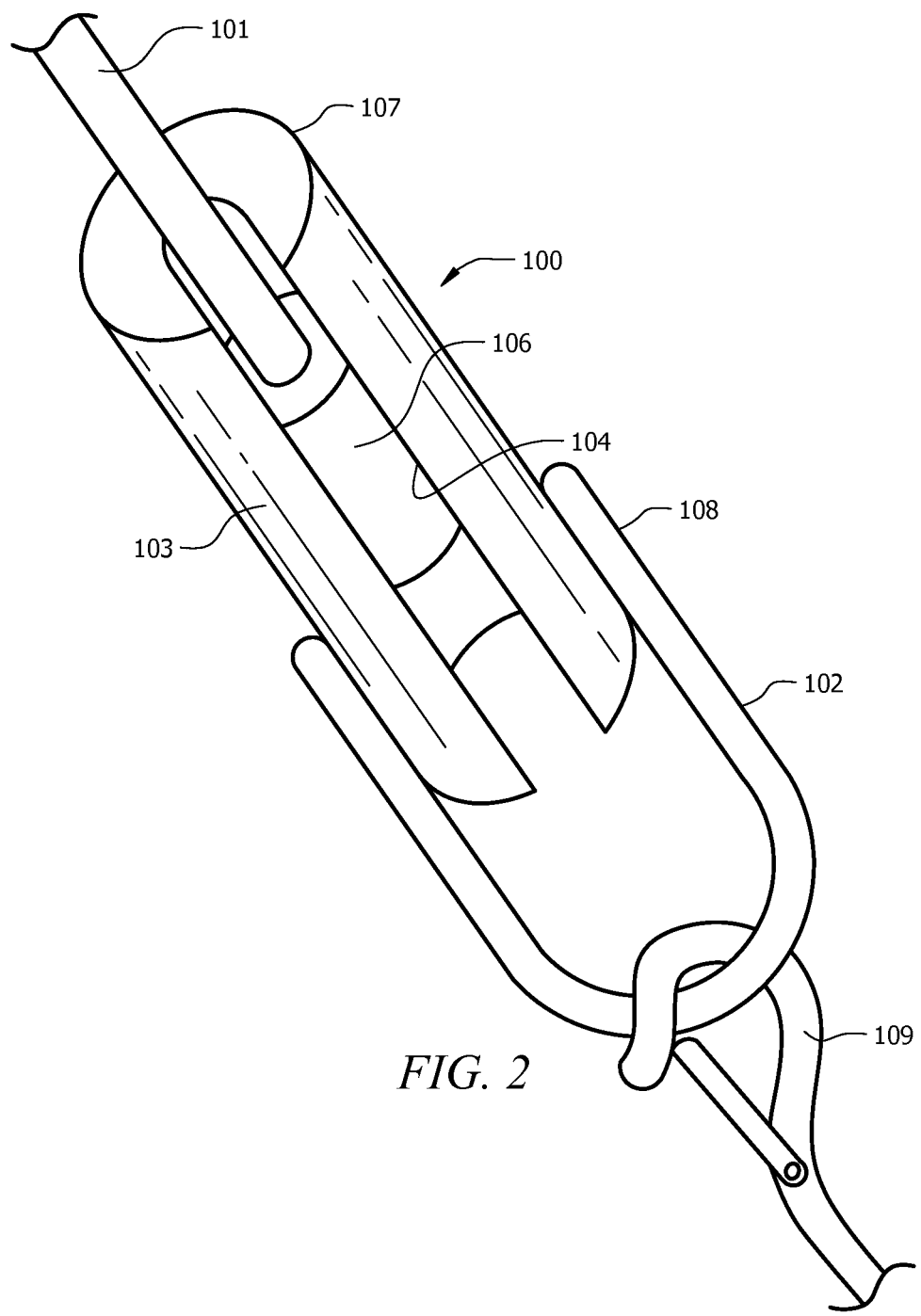
FIG. 2 is a perspective view of a cable puller in one embodiment.

Turning now to FIG. 2, FIG. 2 is a perspective view of a cable puller in one embodiment. As depicted the cable puller 100 comprises a hollow cylinder. This is for illustrative purposes and should not be deemed limiting. The cable puller 100 can comprise virtually any cross-sectional shape including round, oval, triangular, square, rectangular, hexagonal, and virtually any polygon. Further, in some embodiments the cable puller 100 is not hollow but instead offers sufficient recesses to receive the cable 101 and the button 106.

In one embodiment, and as depicted, the cable puller 100 has an open downstream end. As depicted, the cable puller 100 has a partially closed upstream end which prevents upstream movement of the button 106, as will be discussed in more detail below.

FIG. 2 shows the cable 101 nested within a cable puller 100. A cable puller 100 as used herein refers to a device which couples to a button on a cable. As depicted, the cable puller 100 comprises a sleeve 103 which has a slot 104. In one embodiment, and as depicted, the slot 104 extends the entire length of the sleeve 103. The slot 104 provides an area in which the sleeve 103 can receive the cable 101. Thus, the cable 101 can extend within the void created by the slot 104. In one embodiment the slot 104 is sufficiently large to allow the button 106 to be placed and removed through the slot 104. In other embodiments, however, the button 104 must be inserted through the open downstream end of the cable puller 100.

The sleeve 103 can comprise virtually any material. In one embodiment the sleeve 103 comprises metal whereas in other embodiments the sleeve 103 comprises a plastic. The sleeve 103 can comprise any material which can tolerate and withstand the tension applied to the cable 101. The sleeve 103 can comprise steel, cast iron, cast steel, forged steel, and combinations thereof.

Figure 3:
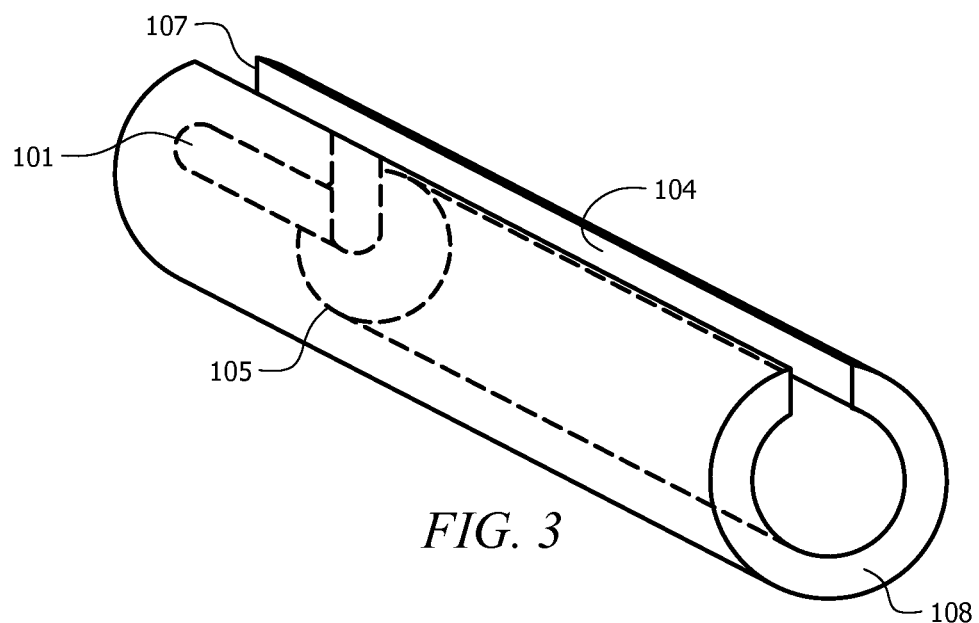
FIG. 3 is a perspective view of the sleeve in one embodiment.
Figure 4:
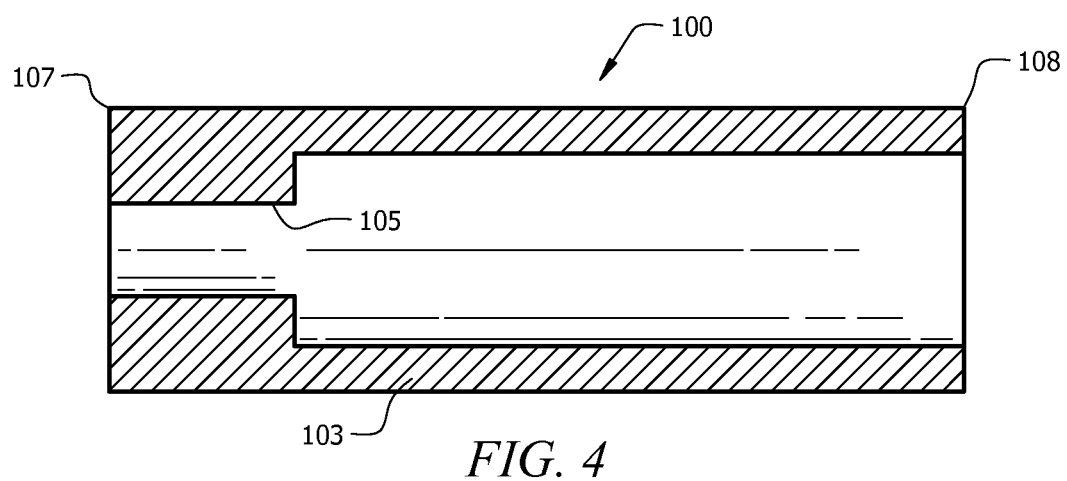
FIG. 4 is a cross-sectional view of the sleeve in one embodiment.

The sleeve 103 has an upstream end 107 and a downstream end 108. The upstream end 107 is the end furthest away from the anchor, and the downstream end 108 is the end closest to the anchor. Turning now to FIGS. 3 and 4, FIG. 3 is a perspective view of the sleeve in one embodiment, and FIG. 4 is a cross-sectional view of the sleeve in one embodiment. As can be seen in FIG. 3, the slot 104 extends the entire length of the sleeve 103. Further, shown in hidden lines is a plate 105. A plate 105 refers to any device which restricts upstream movement of the button 106. The plate 105 can comprise an area of reduced diameter, a protrusion, or any other device which prevents movement of the button, and accordingly the cable 101, upstream. As depicted in FIGS. 3 and 4, the plate 105 offers an area of reduced diameter to prevent the button 107 from slipping upstream of the plate 105. As seen in FIG. 4, the upstream end comprises a smaller inner diameter than the inner diameter downstream of the plate 105. The comparatively larger inner diameter of the sleeve 103 downstream of the plate 105 provides sufficient space in which to nest and receive the button 106. Accordingly, in one embodiment, the button 106 comprises a diameter which is less than the inner diameter of the sleeve 103 downstream of the plate 105. In one embodiment, the button 106 comprises a diameter which is less than the inner diameter of the sleeve 103 on the downstream end 108. Conversely, in one embodiment, the button 106 comprises a diameter which is less than the inner diameter of the sleeve 103 upstream of the plate 105. In one embodiment, the button 106 comprises a diameter which is less than the inner diameter of the sleeve 103 on the upstream end 107.

The depiction of a plate 105 comprising a reduced diameter is for illustrative purposes only and should not be deemed limiting. In other embodiments the diameter is not reduced upstream of the plate but is instead reduced at the plate. The plate 105, in such instances, can comprise a washer, a bolt, a screw, or other such protrusion which decreases the diameter at the location of the plate 105 so as to prevent movement of the button 106 upstream of the plate 105.

In one embodiment, the plate 105, while restricting movement of the button 106, is sufficiently sized to allow the comparatively smaller cable 101 to pass. Thus, in one embodiment the reduced diameter upstream of the plate 105 is larger than the diameter of the cable 101.

As can be seen in FIG. 4, a button 106 can be received and nested in the larger diameter portion downstream of the plate 105. The plate 105 will then prevent movement of the button 106 upstream of the plate 105 but movement of the button 106 downstream will not be restricted.

Referring back to FIG. 2, as noted, the plate 105 restricts movement of the cable 101 relative to the cable puller 100. Thus, the plate 105 couples the cable 101 to the cable puller 100. If the cable puller 100 is pulled in the downstream direction, the button 106 engages the plate 105 and the cable puller 100 pulls the cable 101 in the downstream direction as well. Conversely, in one embodiment, if the cable puller 100 is pushed in the upstream direction, the button 106 is disengaged from the plate 105 and movement of the cable puller 100 will not cause movement of the cable 100. Likewise, in one embodiment, if the downstream end of the cable 101 is pulled in a downstream direction, the cable 101 can slide relative to the cable puller 100. However, if the upstream end of the cable 101 is pulled in an upstream direction, the cable 101 cannot slide relative to the cable puller 100 because the button 106 on the cable 101 will engage the plate 105 of the cable puller 100.

Coupled to the sleeve 103 is the coupler 102. The coupler 102 offers the ability to attach a pulling device 109 at a location downstream of the sleeve 103 so as to not interfere with the cable 101. Further, the coupler 102 provides an opportunity to direct and guide the cable 101. In one embodiment the coupler 102 provides a non-destructive method of attaching a chain or other wire to the guy wire being pulled.

The coupler 102 can be attached to the sleeve 103 via any device or method known in the art. The coupler 102 can be attached via welding, soldering, screws, bolts, etc. As depicted, the coupler 102 comprises a bend bar which is attached at opposing ends to the sleeve 103. As depicted, the coupler 102 comprises a ½ inch diameter bar.

As noted, the coupler 102 can be attached or coupled, either directly or indirectly through an intermediary, to a pulling device 109. For example, the coupler 102 can be coupled directly to a come-along or other pulling device 109, or the coupler 102 can be coupled to a hook or chain which is coupled to the come-along or other pulling device 109. In one embodiment the coupler 102 is coupled to a lockable hook which is then attached to a pulling device 109. A lockable hook ensures the pulling device 109 is locked in place in connection with the cable puller 100. A lockable hook ensures the hook does not slide or otherwise become disengaged from the cable puller 100. The pulling device 109 can comprise any device which can cause a tension to be exerted on a cable 101. In one embodiment the pulling device 109 comprises a JE Shaffer Come-Along. The pulling device 109 can be coupled directly or indirectly to the anchor 110. While one embodiment has been described wherein the pulling device 109 is manually operated, in other embodiments the pulling device 109 is operated via a machine.

The cable puller 100 can be scaled to virtually any size to accommodate the size of the cable 101. One embodiment will be described in reference to a $9/16$ diameter wire rope, but this is for illustrative purposes only and should not be deemed limiting.

In an example where the cable 101 comprises a $9/16$ inch diameter wire rope, the sleeve 103 ranges from about 4 inches to about 12 inches in length. In one embodiment, the sleeve 103 has a length of about 6 inches. The sleeve 103 has an outer diameter between about 1 inch to about 3 inches in diameter. In one embodiment the sleeve 103 has an outer diameter of about 2 inches. In one embodiment, the larger inner diameter downstream of the plate 105 comprises a diameter of about 1.35 inches and the diameter upstream of the plate 105 has a diameter of 0.633 inches. Such a reduced diameter is still large enough for the $9/16$ inch diameter cable 101 to pass.

The button 106 in one embodiment has a diameter of between about ⅛ of an inch to 2 inches in diameter, depending upon the diameter of the wire. In one embodiment the button 106 has a length of between ¼ of an inch to 4 inches. In one embodiment the buttons comprise buttons manufactured by the Crosby Group.

One embodiment wherein the cable puller 100 has no moving parts has been described, however, the cable puller 100 is not so limited. In one embodiment, the cable puller 100 comprises a safety latch. A safety latch, as used herein, refers to a latch which further secures the button 106 in its locked position within and relative to the cable puller 100.

The safety latch, in one embodiment, comprises a pin which secures and engages the button 106 to ensure it does not move. The pin can comprise a mechanical locking mechanism which locks and secures the button 106. While the button 106 should not move while the cable 101 is under tension, because individuals and machinery will be located near and below the mast 111, the safety latch offers an additional safety feature to prevent the button 106 from slipping. Other than pins, the safety latch can also comprise a removeable lock which further couples the cable 101 to the button 106.

In another embodiment, the safety latch comprises a door which when closed prevents the button 106 from disengaging from the cable puller 100. The door can be rotatably or slidably connected to the cable puller 100. The door can be securely closed with a spring, a bolt, or other fastening devices known in the art. When closed, a safety latch increases the safety and effectiveness of the cable puller 100 by providing an additional mechanism which prevents the button 106 from becoming dislodged or otherwise decoupled from the plate 105 and/or the cable puller 100. Such a device provides an additional redundancy to prevent accidents and injuries which could result from tension loss. In one embodiment the safety latch comprises a spring or other force inducing item which applies a force to prevent the button 106 from decoupling from the plate 105.

Referring to FIG. 1, an additional safety feature will be discussed. In one embodiment, an additional line will couple the cable puller 100 to the pulling device 109 and/or the anchor 110. This provides an additional line which will maintain contact with the cable puller 100 in the event the pulling device 109, for example, fails. The additional line can comprise a wire, a cable, a chain, a rope, or any cable discussed herein.

While the cable puller 100 has been described, a method of using it will now be described. As noted, a method of using the cable puller 100 in relation to a removeable drilling mast 111 will be described, this is for illustrative purposes only and should not be deemed limiting. As depicted, the drilling mast 111 is coupled to a truck. The truck is directed to the desired location of the mast 111. Thereafter, a plurality of guy wires are used to secure the drilling mast 111 in place.

The cable 101, as depicted, comprises at least one button 106 secured thereto. The cable 101, is one embodiment is pulled generally taut. Then, the closest button 106 to the cable puller 100 is inserted into the cable puller 100. Any excess cable 101 can fall downward as illustrated in FIG. 1. Thereafter, tension is applied by pulling the cable puller 100 in the downstream direction. The tension can be applied with any pulling device discussed herein. By pulling the cable puller 100, the cable 101 also moves in the downstream direction.

Once the mast 111 is in the desired location and/or the desired amount of tension has been supplied, the pulling device is stopped and no additional tension is applied. Accordingly, movement of the cable puller 100 is stopped.

The process is repeated for each guy wire. In some embodiments, a plurality of guy wires are utilized. In some embodiments the mast 111 is secured at various directions by the guy wires. As an example, in one embodiment one or more guy wire will be secured north of the mast 111, one or more guy wires will be secured south of the mast 111, one or more guy wires will be secured west of the mast 111, and one or more guy wires will be secured east of the mast 111.

To release tension, the process is reversed. Namely, the pulling device releases tension on the cable puller 100. Once sufficient tension has been released, the button 106 can disengage from the plate 105. Thereafter, the button 106 can be removed from the cable puller 100. The button 106 can be removed from the slot if the slot is sufficiently wide. Or the button 106 can be removed from the downstream end. In one embodiment the downstream end is an open end. The cable puller 100 is then decoupled from the cable 101.

While the invention has been particularly shown and described with reference to a preferred embodiment, it will be understood by those skilled in the art that various changes in form and detail may be made therein without departing from the spirit and scope of the invention.

ADDITIONAL DESCRIPTION

The following clauses are offered as further description of the disclosed invention.

Clause 1. A system for pulling a cable, said system comprising:
a cable comprising at least one button;
a cable puller coupled to said cable, wherein said cable puller comprises at least one slot for receiving said cable and a plate for engaging said button;
wherein said cable puller comprises a sleeve, wherein said sleeve has an upstream end and a downstream end, wherein said plate is located on said upstream end; and
a pulling device coupled said cable puller.

Clause 2. The system of any proceeding or preceding clause wherein said pulling device comprises a come-along.

Clause 3. The system of any proceeding or preceding clause wherein said cable pulling device is coupled to an anchor.

Clause 4. The system of any proceeding or preceding clause wherein at least one button is coupled along the length of said cable, and wherein at least one button is not coupled to the end of said cable.

Clause 5. The system of any proceeding or preceding clause wherein said cable comprises a guy wire.

Clause 6. The system of any proceeding or preceding clause wherein said sleeve comprises an upstream inner diameter upstream of said plate and a downstream inner diameter downstream of said plate, wherein said upstream inner diameter is smaller than said downstream inner diameter, and wherein the outer diameter of said button is greater than the downstream inner diameter.

Clause 7. The system of any proceeding or preceding clause wherein said sleeve comprises a hollow cylindrical tube.

Clause 8. The system of any proceeding or preceding clause wherein said sleeve comprises an upstream inner diameter at said plate and a downstream inner diameter downstream of said plate, wherein said upstream inner diameter is smaller than said downstream inner diameter, and wherein the outer diameter of said button is greater than the downstream inner diameter.

Clause 9. The system of any proceeding or preceding clause wherein said cable puller comprises a coupler at said downstream end.

Clause 10. The system of any proceeding or preceding clause wherein said slot extends from said upstream end of said sleeve to said downstream end of said sleeve.

Clause 11. The system of any proceeding or preceding clause wherein said cable puller further comprises a safety latch.

Clause 12. The system of any proceeding or preceding clause wherein said button comprises as button which has been crimped on said cable.

Clause 13. The system of any proceeding or preceding clause wherein said cable is coupled to a portable mast.

Clause 14. A cable puller comprising:
a sleeve comprising an upstream end and a downstream end;
a slot extending from said upstream end to said downstream end;
a plate for engaging a button on a cable, wherein said plate is located on said upstream end;
wherein said sleeve comprises an upstream inner diameter and a downstream inner diameter downstream of said plate, wherein said upstream inner diameter is smaller than said downstream inner diameter.

Clause 15. The cable puller of any proceeding or preceding clause further comprising a safety latch.

Clause 16. The cable puller of any proceeding or preceding clause wherein said upstream inner diameter is smaller than the outer diameter of said button.

Clause 17. A method of tightening a cable, said method comprising:
a) coupling a button on a cable with a cable pulling device;
b) pulling said cable pulling device downstream relative to said button such that a plate on said cable pulling device engages said button;
c) applying a force on said pulling device causing said cable pulling device to pull said cable.

Clause 18. The method of any proceeding or preceding clause wherein said cable pulling device comprises:
a sleeve comprising an upstream end and a downstream end;
a slot extending from said upstream end to said downstream end;
a plate for engaging a button on a cable, wherein said plate is located on said upstream end;
wherein said sleeve comprises an upstream inner diameter and a downstream inner diameter downstream from said plate, wherein said upstream inner diameter is smaller than said downstream inner diameter, and wherein said upstream inner diameter is smaller than the outer diameter of said button.

Clause 19. The method of any proceeding or preceding clause wherein said button is located on a length of said wire and is not located on an end of said cable.

Clause 20. The method of any proceeding or preceding clause wherein said applying a force comprises uses a come-along, wherein said cable comprises a guy wire, wherein said button is crimped on to said cable, and wherein said cable pulling device comprises a safety latch to further secure said button within said pulling device.

I claim:

1. A system for pulling a cable, said system comprising:
a cable comprising at least two buttons, wherein at least one of said at least two buttons comprise an outer diameter, and wherein said buttons are coupled to said cable;
a cable puller coupled to said cable, wherein said cable puller comprises at least one slot for receiving said cable and a plate for engaging said buttons;
wherein said cable puller comprises a sleeve, wherein said sleeve has a first distal end and a second distal end located downstream from said first distal end, wherein said plate is located upstream from said second distal end, and wherein said plate engages with one of said buttons to provide tension, and wherein said slot extends from said first distal end all the way to the second distal end; and
a pulling device coupled to said cable puller;
and wherein said cable comprises two opposite ends, and wherein at least one button of said at least two buttons is not coupled to either end of said cable.

2. The system of claim 1 wherein said pulling device comprises a come-along.

3. The system of claim 1 wherein said pulling device is coupled to an anchor.

4. The system of claim 1 wherein said cable comprises a guy wire.

5. The system of claim 1 wherein said sleeve comprises an upstream inner diameter upstream of said plate and a downstream inner diameter downstream of said plate, wherein said upstream inner diameter is smaller than said downstream inner diameter, and wherein the outer diameter of said button is greater than the upstream inner diameter.

6. The system of claim 1 wherein said sleeve comprises a hollow cylindrical tube.

7. The system of claim 1 wherein said sleeve comprises an upstream inner diameter at said plate and a downstream inner diameter downstream of said plate, wherein said upstream inner diameter is smaller than said downstream inner diameter, and wherein the outer diameter of said button is greater than the upstream inner diameter.

8. The system of claim 1 wherein said cable puller comprises a coupler.

9. The system of claim 1 wherein said buttons comprise buttons which have been crimped on said cable.

10. The system of claim 1 wherein said cable is coupled to a portable mast.

11. A method of tightening a cable, said method comprising:
a) coupling at least two buttons on a length of cable with a cable pulling device;
b) pulling said cable pulling device downstream relative to one of said buttons such that a plate on said cable pulling device engages said one of said buttons;
c) applying a force on said pulling device causing said cable pulling device to pull said cable, wherein said cable pulling device comprises:
a sleeve comprising an upstream distal end and a downstream distal end;
a slot extending the entire length from said upstream distal end to said downstream distal end;
said plate for engaging said one of said buttons on said cable;
wherein said sleeve comprises an upstream inner diameter and a downstream inner diameter downstream from said plate, wherein said upstream inner diameter is smaller than said downstream inner diameter, and wherein said upstream inner diameter is smaller than the outer diameter of said at least two buttons.

12. The method of claim 11 wherein said one of said buttons is located on a length of said cable and is not located on an end of said cable.

* * * * *